United States Patent [19]

Kowalewski et al.

[11] Patent Number: 5,398,121
[45] Date of Patent: Mar. 14, 1995

[54] METHOD AND DEVICE FOR GENERATING A DIGITAL LOOKUP TABLE FOR PRINTING INKS IN IMAGE REPRODUCTION EQUIPMENT

[75] Inventors: Joern Kowalewski, Eschborn; Friedrich W. Vorhagen, Stolberg, both of Germany

[73] Assignee: Linotype-Hell AG, Eschborn, Germany

[21] Appl. No.: 940,894

[22] PCT Filed: Apr. 23, 1991

[86] PCT No.: PCT/DE91/00325

§ 371 Date: Oct. 23, 1992

§ 102(e) Date: Oct. 23, 1992

[87] PCT Pub. No.: WO91/16785

PCT Pub. Date: Oct. 31, 1991

[30] Foreign Application Priority Data

Apr. 23, 1990 [DE] Germany .......... 40 12 905.5

[51] Int. Cl.⁶ .............................................. H04N 1/46
[52] U.S. Cl. .................................. 358/504; 358/523
[58] Field of Search ............ 358/500, 504, 518, 523, 358/525, 445

[56] References Cited

U.S. PATENT DOCUMENTS 4,992,861  2/1991  D'Errico .
5,003,299  3/1991  Batson et al. .
5,195,043  3/1993  Varner .

FOREIGN PATENT DOCUMENTS 0273398  7/1988  European Pat. Off. .
0321983  6/1989  European Pat. Off. .

Primary Examiner—Bentsu Ro
Attorney, Agent, or Firm—Hill, Steadman & Simpson

[57] ABSTRACT

The subject of the invention is a method and a device for generating a digital lookup table for printing inks in image reproduction equipment. Color scan values obtained by photoelectric scanning of an original are used for this purpose. The full colors of the three printing inks and white are measured. Model colors are determined which are in as linear as possible a relationship to the printing inks. This is achieved by a position of the chromaticity range of the print scale such that the primary stimuli of the model colors in the chromaticity diagram are each on one beam of the trajectories of the scale colors through the white point while the triangle set up between the primary stimuli encloses the chromaticity range of the print scale. The scale division of the primary stimuli is adjusted with a cube root to the printing inks. The number of fields to be scanned is determined on the basis of the measured values of the space diagonals. A cubic spline interpolation follows to generate the lookup table.

12 Claims, 3 Drawing Sheets

FIG. 2
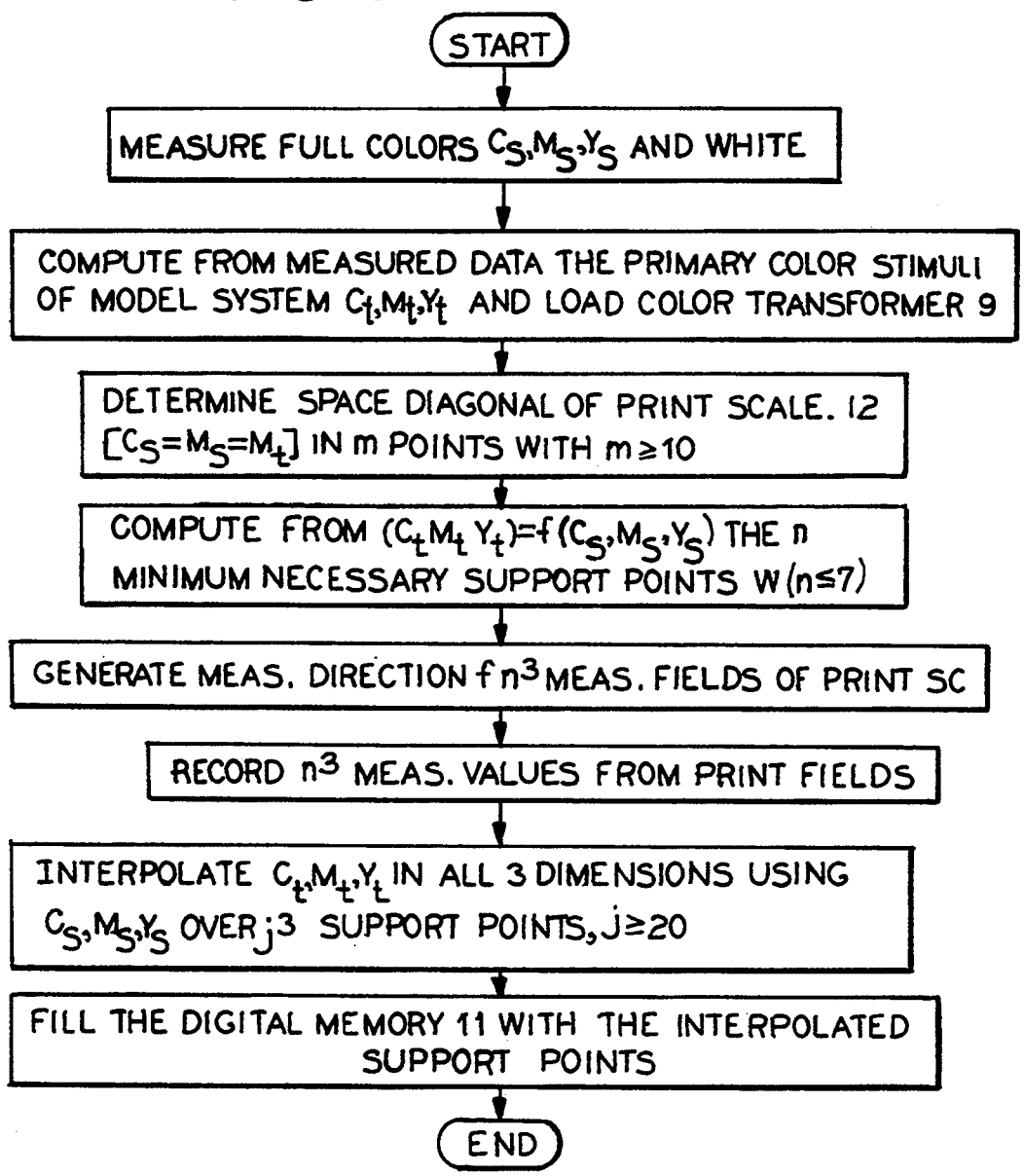
FIG. 5a  FIG. 5b  FIG. 5c
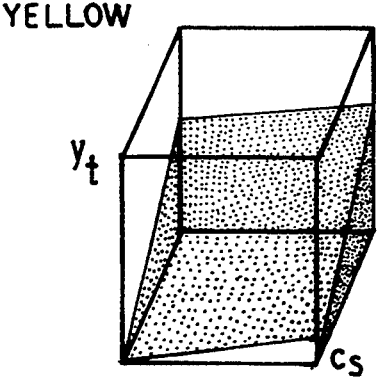
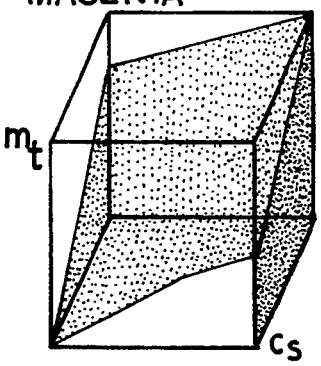
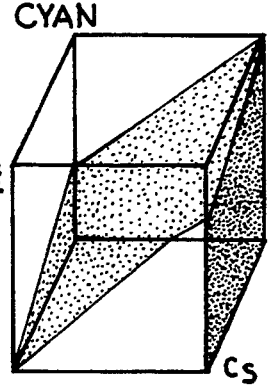

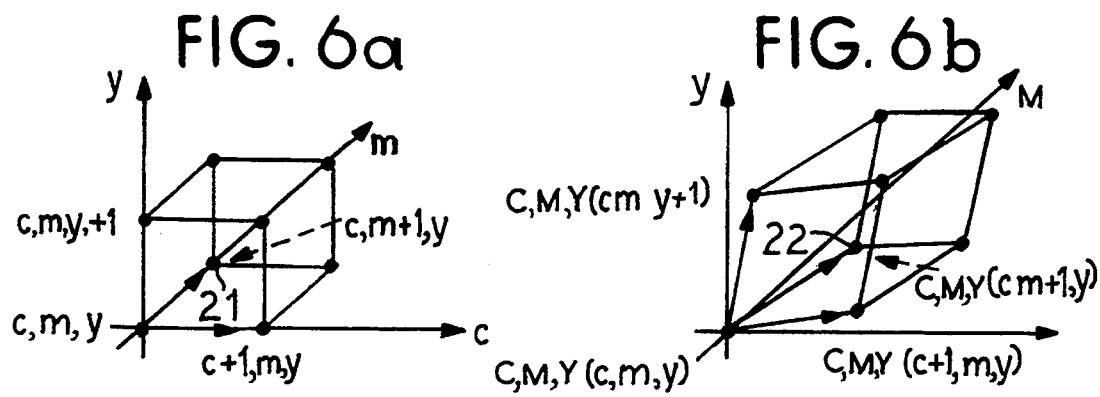
FIG. 6a
FIG. 6b
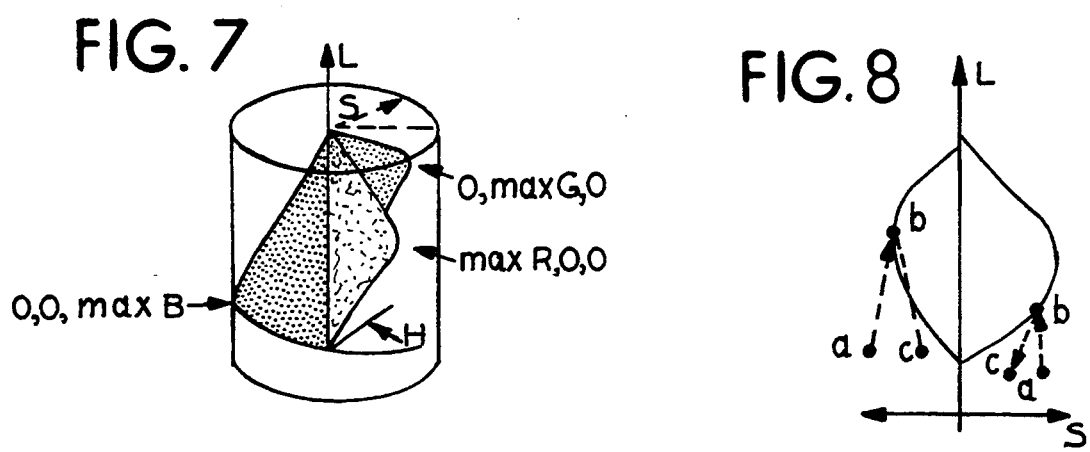
FIG. 7
FIG. 8
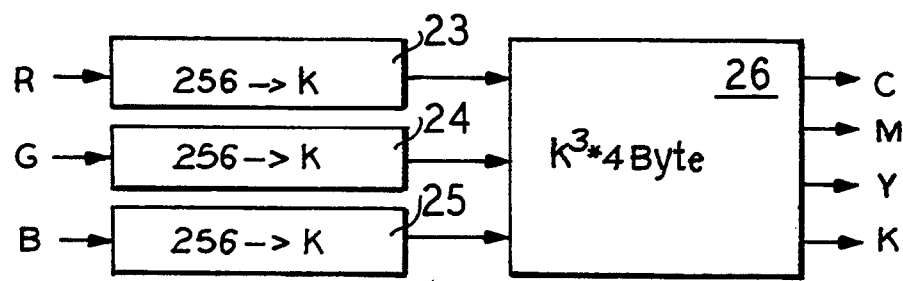
FIG. 9
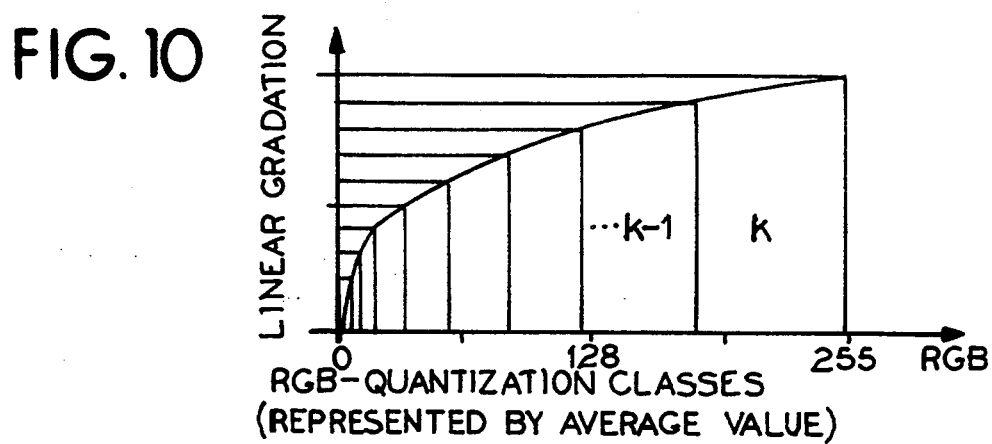
FIG. 10

METHOD AND DEVICE FOR GENERATING A DIGITAL LOOKUP TABLE FOR PRINTING INKS IN IMAGE REPRODUCTION EQUIPMENT

BACKGROUND OF THE INVENTION

The invention relates to a method for generating a digital lookup table for printing inks in image reproduction equipment using color scan values obtained by photoelectric scanning of an original.

The basis for generation of a transformation table for the primary colors "RGB" into the complementary colors "CMYK" is spectrophotometric measurement of a color scale generated with that process (e.g. Offset, Euroskala, coated paper) for which this table is later to apply. With unlimited expenditure, it would be possible to thereby obtain by measurement the right field for every required color stimulus from a scale with 1% gradation of the printing inks, i.e. 100*100*100 color fields. A method of this type would provide, if the color range of the scale is not always exceeded, the formula for the complementary colors "CMYK" accurate to 1%. Highly saturated hues have no corresponding field. In addition, one million measurements are impracticable for generating a table.

A color correction device for image reproduction equipment is known with which digitalized color density values of individual color separations obtained by photoelectric scanning are converted into complementary color density values. With the complementary color density values it is possible to obtain color separation negatives. The complementary color density values are color-corrected using correction data filed in a memory and addressable and outputtable by the color density values. A gray component is determined from the color density values. This is achieved by comparing the color density values. The gray component is processed by comparison with a predetermined white light value to obtain an equivalent gray value with which a memory is addressed that contains a specific gray value for each complementary color density value. By subtracting the gray components from the color density values, complementary color density values are generated. The various complementary color density values are each combined with an associated specific gray value. Corrections to the chromatic component and to the gray component independently of one another permit a saving of memory capacity for the conversion table (German patent DE-PS 30 15 396).

One of the objects underlying the invention is to develop a method for generation of a digital lookup table (memory table) of complementary printing inks for image reproduction equipment using standardized color scan values obtained by photoelectric scanning of an original, e.g. EBU red, green, blue. With the method of the invention a lookup table can be produced from a few measurement fields that is sufficiently accurate for determining the proportions of printing inks. In addition, non-reproducible color stimuli must be adapted to useful substitute values.

The object is substantially achieved in accordance with the invention in that the full colors of the three printing inks and white are measured by scanning of corresponding originals, in that model colors are determined which are in as linear as possible a relationship to the printing inks by means of a position of the chromaticity range of the print scale such that the primary stimuli of the model colors in the chromaticity diagram are each on one beam of the trajectories of the scale colors through the white point while the triangle set up between the primary stimuli encloses the chromaticity range of the print scale. The scale division of the primary stimuli is adjusted with the cube root to a linear gradation of the printing inks. The space diagonals of the printing inks as a function of the model colors are used to determine the number of fields to be scanned, scan values of which are further processed by cubic spline interpolation with a higher number of support points in order to generate the lookup table. The values of the model colors are each stored as a function of the printing ink values.

A lookup table of the printing inks as a function of the model colors is preferably generated from the stored lookup table. The latter table is used in the reproduction equipment to determine the proportions of printing inks for the original artwork measured values.

A substantial element of the invention is based on the setup of a computation model whose coordinate axes tally as closely as possible with the axes of the print scale (cyan, magenta and yellow). A component of the model color space depends in largely linear form on one and one only printing ink. The CIE-XYZ color space of the International Lighting Commission does not—unlike the model color space described above—fulfill these requirements, since the directions of its coordinate axes do not even approximately tally with those of the primary stimuli of the print scale. Particularly unfavorable is the fact that identically sized color intervals at different points on the print scale are reproduced on variously sized differences in the CIE-XYZ color space. The aforementioned substitute colors $C_t$, $M_t$ and $Y_t$ describe the printing inks approximately and can be advantageously converted as a group into values of the CIE-XYZ color space. The relationship $C_t = 1 - R$ makes the substitute color stimulus $C_t$ proportional to the color stimulus $C_s$. Weighting with the cube root linearizes the dependence of the model color on the printing ink. The conversion between the coordinates of the RGB color space and of the CIE-XYZ color space and vice versa is achieved in each case with a transformation matrix that is known per se (Richter: Einführung in die Farbmetrik, Kap. 6).

The expense of creating a print scale depends on the number of fields to be measured. An acceptable expenditure is achieved when the number of fields to be measured is not more than a few hundred. If scan values are generated for each coordinate axis of the print scale, $n^3$ fields must be measured. The number of scan values must ensure a sufficiently accurate coverage of the print scale.

In the space diagonals of the coordinate system of full colors $C_s$, $M_s$ and $Y_s$, the proportionate basic colors of the print scale are present in equal amounts. With these space diagonals as the "gray axis" conclusions can be drawn as to the remaining non-linearities of the print scale with regard to the model color space. On the basis of the dependence of the hue values on the print scale values in the "gray axis" the minimum necessary (not equidistant) scanning steps are determined. The scanning steps are selected such that points are obtained along the "gray axis" that are spread as evenly as possible and at the same time at locations with as few deviations as possible between the substitute colors.

Preferably, not more than seven scanning steps are stipulated. The $n^3$ scan values are then extrapolated by a cubic spline interpolation to a certain number of support points greater than the number of scanning steps. It has been shown that a support point quantity of $32^3$ values is favorable. The cubic spline interpolation results in color cubes containing printing ink values. The subdivision of the scale space is equidistant here, i.e. a color cube with a scanning density of approx. 3% is obtained in each printing ink.

The table prepared in the manner described above gives the dependence of the color stimulus on the printing ink proportions. The table permits determination of the proportions of printing inks necessary to reproduce a color stimulus.

In a preferred embodiment, the associated combinations of printing inks for all interesting combinations of color stimuli are determined iteratively in order to generate a table giving the proportions of the printing inks $C_s$, $M_s$ and $Y_s$ needed to reproduce a color stimulus, by proceeding from any point in the print scale table to first compute both the difference between the color stimulus required and a random scale entry point, and the complete differential in this point in order to ascertain a vector that gives, in scale increments, the amount and direction of the transition to another entry point better suited to the required color stimulus. For this scale entry point appropriate computation steps are taken to establish a further vector that gives the transition to a scale entry point better suited to the required color stimulus. The computation steps for ascertaining additional scale entry points are repeated until the scale entry point obtained remains the same. Color value differences still remaining are minimized by trilinear interpolation. Using this method, which can be designated as inversion, a lookup table table for RGB or for any colors based on CIE-XYZ coordinates to CMY is obtained.

It may be that a color stimulus is required that is outside the chromaticity range of the measured print scale. The iteration process provides for such color stimuli, for one or more colors, a dot percentage of >100% and/or <0%. These are highly saturated colors that cannot be reproduced. However, in order nevertheless to reproduce color stimuli for inks outside the chromaticity range of the measured print scale, it is expedient to employ another color model based on hue, saturation and lightness (HSL color model). If the iteration process leaves the color space of the lookup table, then it is advantageous to correct the required color stimulus with reference to the nearest color stimulus feasible with the lookup table. While a change in the hue should not occur, correction may result in a substitute color having a lower saturation in the case of very bright or very dark hues, and possibly a slightly different lightness.

In order to determine the printing inks for a color stimulus outside the chromaticity range of the measured lookup table, a color space corresponding to the lab model stipulated by the International Lighting Commission (CIE) is computed as follows for hue, saturation and lightness:

$$L = 116 \left( \sqrt[3]{(Y/Y_o)} - 16 \right)$$

$$a = 500 \left( \sqrt[3]{(X/X_o)} - \sqrt[3]{(Y/Y_o)} \right)$$

-continued $$b = 200 \left( \sqrt[3]{(Y/Y_o)} - \sqrt[3]{(Z/Z_o)} \right)$$

$$H = \arctan (b/a)$$

$$S = \sqrt{(a^2 + b^2)}$$

with $X_0$, $Y_0$ and $Z_0$ as the color stimulus of the white point (cf. DIN 6174), in which "L" means the lightness, "H" the hue, "S" the saturation and "X Y Z" the virtual primary stimuli as normal stimuli, where the corresponding values for lightness, hue and saturation are filed in a table with one address space for each, with stipulation of the maximum lightness value for maximum fluctuations of the primary stimuli and with standardization of the saturation to the maximum value occurring in the blue hues, and where for all combinations of hue, saturation and lightness occurring, the values of the printing inks are determined by iteration and then stored. In this way, the point at which the required color value leaves the range of the lookup table can only be determined as a function of the saturation. All saturations above this value can then be allocated the printing ink triplet of the last color value achieved with constant lightness and constant hue.

For obtaining print results in dark hues, a black separation is preferably generated that has been obtained using a densitometer from a test form having that number of chromatic gray bars of which each contains a constant black component, where the color density values are converted to lightnesses and where a spline interpolation increases the data density until the dependence of lightness decrease on the addition of black is given in predetermined steps for each three-color lightness level. If a hue can no longer be achieved in three colors with saturation at the predetermined lightness, transition to the next highest lightness level that the hue can reproduce follows, and the lightness is then reduced by addition of black to the required value.

To save on memory capacity, the lookup table of the printing inks is not addressed directly through the measured color stimuli. The primary colors are divided in each case into a number of classes of representative values stored in a separate table. Starting from this separate table, the three-dimensional table with the printing inks is controlled, which for that reason needs only the number of memory places corresponding to the cubic number of the number of classes. The number of classes is preferably adjusted to the human visual sense curve by dividing the primary stimuli into ranges of equal size under the cube root.

It must be noted in particular that a change in the lightness $\Delta L$ takes place as a function of black ($\Delta L = f(K)$).

A device for implementation of the method described above contains in accordance with the invention a light source and a measuring head to which is connected a spectrophotometer connected on its output side to a sequential control and to a color transformer, to which is connected a cubic spline interpolator controlled by the sequential control, and to which is connected a digital memory controlled by the sequential control. The sequential control is preferably a central computer.

BRIEF DESCRIPTION OF THE DRAWINGS

Further details, advantages and features of the invention are shown not only in the claims and in the features stated therein singly and/or in combination, but also in the following description of preferred embodiments shown in the drawings.

FIG. 2 shows a sequence diagram of process steps implemented to generate the lookup table;

FIGS. 5a, b, c show print scale tables for the three substitute colors as a function of the printing inks;

FIGS. 6a, b show details of the print scale tables shown in FIG. 5,

FIG. 7 shows a perspective view of a color space;

FIG. 8 shows a diagram of the lightness as a function of the saturation with constant hue of a plane of the color space shown in FIG. 7;

FIG. 9 shows a memory subdivision in diagram form; and

FIG. 10 shows a graph of the quantization of the primary stimuli.

DESCRIPTION OF THE PREFERRED EMBODIMENTS

Figure 1:
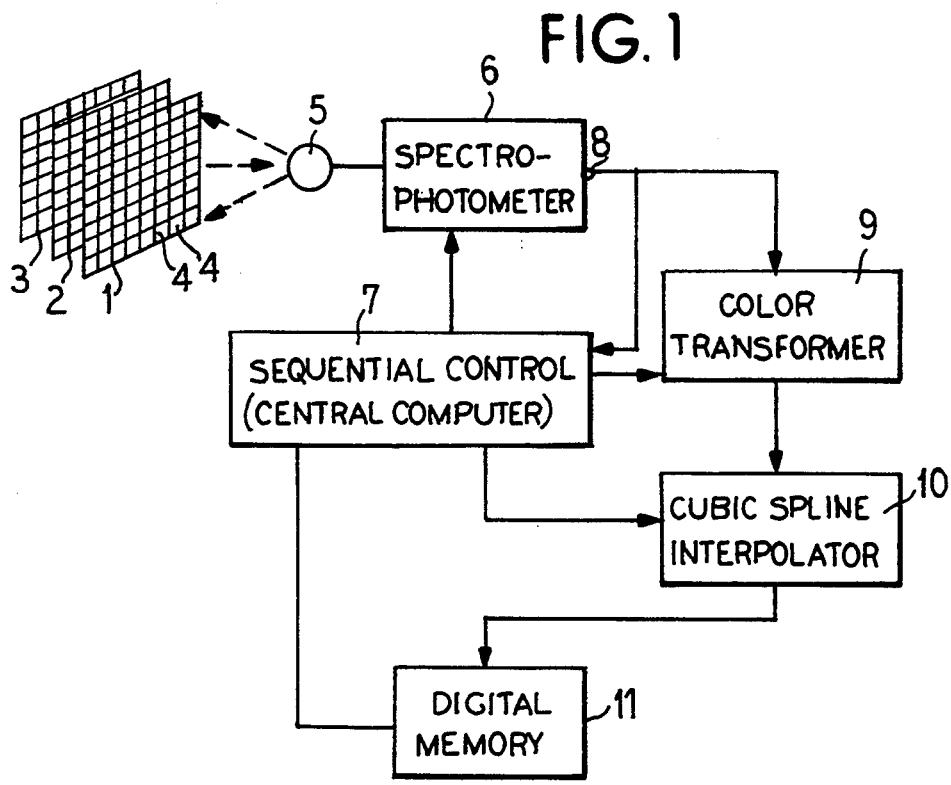
FIG. 1 shows a device for generation of a digital lookup table of complementary printing inks in diagram form.

For generating a digital lookup table for complementary printing ink proportions used in image reproduction equipment, a number of measurement fields are provided on the test sheets (1), (2), (3). On the test sheet (1), measurement fields numbered (4) are provided that each consist of the three complementary colors cyan, magenta and yellow. The yellow component is identical for all fields of a test sheet, but varies from test sheet to test sheet. The color components of cyan and magenta differ on the test sheets (1), (2), (3).

The measurement fields (4) on the test sheets (1), (2), (3) are scanned one after the other using a measuring head (5) containing a light source and photoelectric receiver not shown and having a spectrophotometer (6) connected behind it that is controlled by a sequential control (7). The spectrophotometer (6) generates at its output (8) color values in the CIE standard, i.e. standard color values that are supplied to the sequential control (7) and to a color transformer (9) that generates from the standard color values substitute color values or model color values. The substitute color values, also known as model color values, are supplied to a cubic spline interpolator (10) controlled by the sequential control (7). The spline interpolator (10) outputs a printing ink table that is filed in a digital memory (11). The spectrophotometer (8) has a color correction feature.

For printing, an image defined by RGB color pixels must be converted into the four color separations cyan, magenta, yellow and black. The required quantity ratio of printing inks is determined from an RGB data triplet using a transformation described in detail in the following. The basis for generation of the transformation table of the RGB color values into CMYK color values is the spectrophotometric measurement of the color scale on the test sheets (1), (2), (3) generated with the process (e.g. Offset, Euroskala, coated paper) for which the transformation table is to apply. With very great expenditure, it would be possible to thereby obtain by measurement the right field for every required color stimulus from a scale with 1% gradation of the printing inks, i.e. 100*100*100 color fields. A method of this type would provide, if the color range of the scale is not always exceeded, the formula for CMY accurate to 1%. Highly saturated hues have no corresponding field. In addition, one million measurements are impracticable for generating a table. With the invention, it is possible to describe a print scale with sufficient accuracy using a minimum of measurement fields, and to adapt non-reproducible color stimuli to useful substitute values.

A computation model is presented whose coordinate axes tally as closely as possible with the axes of the print scale for cyan, magenta and yellow, i.e. a component of the model color space should depend in largely linear form on one and one only printing ink. The CIE-XYZ standard color model does not fulfill this requirement. The directions of its coordinate axes do not even approximately tally with those of the primary stimuli of the print scale, and identically sized color intervals are reproduced at different points of the print scale on variously sized differences in XYZ.

For this reason, ideal substitute colors for cyan, magenta and yellow, referred to in the following as $C_t$, $M_t$, $Y_t$, are defined which approximately describe the printing ink for cyan, magenta and yellow, referred to in the following as $C_s$, $M_s$, $Y_s$, but which can be converted as a group into the XYZ coordinates of the standard color chart.

Figure 3:
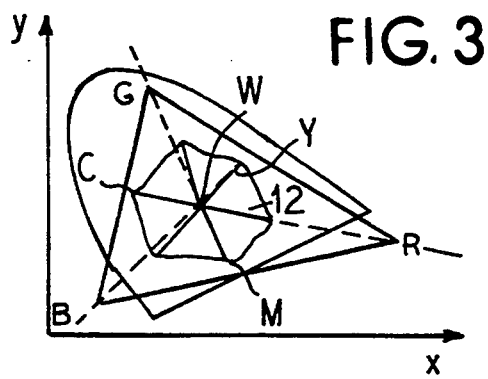
FIG. 3 shows a color chart for substitute colors in graph form.

FIG. 3 shows the chromaticity range of the print scale in the standard color chart. The primary stimuli red, green and blue, referred to in the following as R, G, B, are—as is clear from FIG. 3—so positioned in the model of the ideal substitute colors that the entire print scale (12) is within the triangle set up between RGB. R is on the extension of the cyan geometric locus through the white point, G on that of magenta and B on that of yellow. This ensures an optimum separation of the colors from one another inside the model. The relationship $C_t = 1 - R$ makes $C_t$ proportional to $G_s$, and weighting with the cube root linearizes the dependence of the model color material on the printing ink.

The following apply:

$$C_t = \sqrt[3]{(1-R)} \; ; \quad M_t = \sqrt[3]{(1-G)} \; ; \quad Y_t = \sqrt[3]{(1-B)}$$

The conversion of RGB to XYZ and XYZ back to RGB is achieved using a transformation matrix in each case (cf. Richter Kap. 6).

To limit the expense for measurement of a print scale, it is expedient for the number of fields to be measured not to exceed a few hundred. If scan values are taken in every coordinate axis, $n^3$ fields must be measured. It is particularly favorable if n is not greater than 7. In all other respects, the motto applies "The less the better" as long as the scale is covered with sufficient accuracy.

Figure 4A:
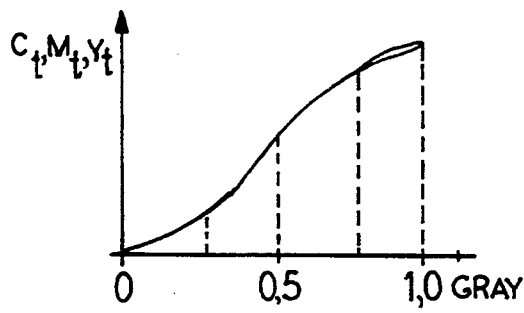
FIGS. 4a, b show graphs of substitute colors as a function of gray values.
Figure 4B:
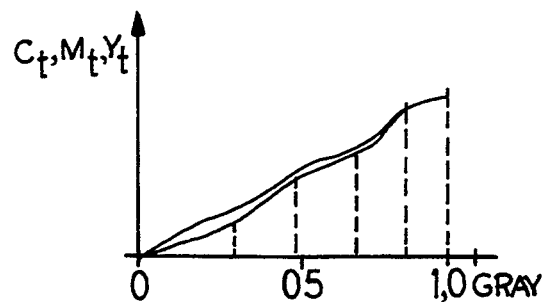

In the space diagonal in the spatial $C_s$, $M_s$, $Y_s$ coordinate system, the proportionate basic colors of the scale are present in equal amounts. These space diagonals of the "gray axis" permit conclusions to be drawn as to the remaining non-linearities of the print scale with regard to the model color space. Based on the dependence of the hue values on the scale values in the gray axis, the minimum necessary (not equidistant) scanning steps are therefore determined. FIGS. 4a and 4b show two different offset scales. The first print scale is best scanned in the points 0%, 30%, 50%, 80%, 100% and combinations thereof. The other scale requires a minimum of 6 scanning steps per coordinate (0%, 30%, 45%, 70%, 85%, 100%).

To generate the lookup table, therefore, fields of the full colors $C_s$, $M_s$, $Y_s$ and of white are measured in a first step (13) (see FIG. 2). In the first step (13), digital data is obtained which contains the $C_s$, $M_s$, $Y_s$ trajectories of the color spider. Step (13) is followed by step (14), in which the primary stimuli $R_t$, $B_t$, $G_t$ of the model system for $C_t$, $M_t$, $Y_t$ are calculated in the manner described above. The computed primary stimuli are loaded into the color transformer (9). A step (15) is then implemented in which the space diagonal of the print scale (12) is generated from the data obtained in step (13). For this purpose, a certain number of equidistant values along the space diagonal is necessary. It has become clear that coverage in m points with m > 10 is favorable. In a step (16), the space diagonal is then used to obtain the number of n scan values with which the space diagonal is most precisely approximated to. As mentioned above, n should be less than 7. The n scan values result, as mentioned above, in $n^3$ scan values, which are obtained from an appropriate number of measurement fields. In the following step (17), the measuring directions for the $n^3$ measurement fields of the test sheets (1), (2), (3) are generated. After generation of the measuring directions, the device shown in FIG. 1 is used to measure and store under computer control $n^3$ measured values of test sheets (1), (2), (3) in a step (18). The method is continued in a step (19) in which the $n^3$ scan values are extrapolated by cubic spline interpolation to a larger number of support points. It has become clear that a support point number of $32^3$ is favorable.

The subdivision of the scale space is equidistant here, i.e. after interpolation the color cube of the scale is present in every color with a scanning density of approx. 3%. It should be noted that this pigment may itself not even include the measured support values. The spline function used assumes a constant rise before the first and after the last interval. The sequence of the colors:

1.) C from n to 32 at n×n points with constant M and Y

2.) M from n to 32 at 32×n points with constant C and Y

3.) Y from n to 32 at 32×32 points with constant C and M.

The result is printing ink tables for the various printing inks which in FIGS. 5a, b and c represent the interpolated substitute colors $Y_t$, $M_t$, $C_t$ as a function of the printing inks $Y_s$, $M_s$, $C_s$. The support points obtained by interpolation as a function of the printing inks are entered in a step (20) into the digital memory (11) in which they are available under appropriate addresses.

The table interpolated from the print scale describes the dependence of the color stimulus on the printing ink proportions, in short:

$$C_t, M_t, Y_t (C_s, M_s, Y_s) \qquad (I)$$

In image reproduction equipment, metering of the printing inks requires the proportions of printing inks that must be applied to reproduce the color, i.e.

$$C_s, M_s, Y_s (C_t, M_t, Y_t) \qquad (II)$$

The conversion of the print table leading from (I) to (II) is referred to as inversion in the following. For all interesting combinations in a stimulus system (e.g. from EBU-RGB of the European Broadcasting Union), the appropriate combination of printing inks is determined iteratively. Proceeding from any point in the scale table (referred to in the following as print scale), the difference between the required color stimulus and that of any scale entry point is first computed in addition to the complete differential in this point. This leads to a vector that gives in scale increments the amount and direction of the transition to a new entry point better suited to the required color stimulus. These computation steps are repeated (iteration) until the entry point into the 32*32*32 element-sized table remains constant. The remaining color value differences are then minimized by linear interpolation (constant differential in tripod). The result is then typically a table from RGB or HSL to CMY with $64^3$ to $80^3$ entries. It must be noted that this method only converges onto the right end value when the prefixed signs of the differential quotients do not change within the model. For this reason, the scale is checked during spline interpolation for monotonously rising model values as the scale values increase. If this condition is infringed by—for example—inaccuracies in both spectrophotometric measurements, the appropriate scan values in these non-permissible dependencies (e.g. $\Delta C_t(\Delta Y_s)$) must be recorrected. The acceptance of this secondary condition is permissible, since as a rule an increase of one printing ink also effects an increase in the model stimuli.

In FIG. 6a, a random point (21) is shown to which the coordinate values c, m+1, y are allocated. The inversion process described above supplies, in accordance with FIG. 6b, the values $C_s$, $M_s$, $Y_s$ (c, m+1, y) at point (22). Point (21) as a support point is surrounded by points not provided with identifying numbers as additional support points. FIG. 6b shows the model values at the support points.

Inversion is implemented in accordance with the following formulas:

If the space of the print scale with the 32**3 support points is regarded in a partially linear fashion, the following applies in a tripod set up at any support point for the color interval:

$$\begin{pmatrix} \Delta C_t \\ \Delta M_t \\ \Delta Y_t \end{pmatrix} = \left( \frac{\partial t}{\partial s} \right) \begin{pmatrix} \Delta C_s \\ \Delta M_s \\ \Delta Y_s \end{pmatrix}$$

(indices s identify the print scale, t the model color space;) with $$\left( \frac{\partial t}{\partial s} \right) =$$

$$\left( \begin{array}{ccc} \frac{C(c+1,m,y) - C(c,m,y)}{\Delta c} & \frac{C(c,m+1,y) - C(c,m,y)}{\Delta m} & \frac{C(c,m,y+1) - C(c,m,y)}{\Delta y} \\ \frac{M(c+1,m,y) - M(c,m,y)}{\Delta c} & \frac{M(c,m+1,y) - M(c,m,y)}{\Delta m} & \frac{M(c,m,y+1) - M(c,m,y)}{\Delta y} \\ \frac{Y(c+1,m,y) - Y(c,m,y)}{\Delta c} & \frac{Y(c,m+1,y) - Y(c,m,y)}{\Delta m} & \frac{Y(c,m,y+1) - Y(c,m,y)}{\Delta y} \end{array} \right)$$

(omit indices t at C, M, Y. c, m, y are entry points into the scale $0 < c,m,y < 32$)

With the assumption that the step widths in the scale are constant and identical in all direction, it follows:

$$\left( \frac{\partial t}{\partial s} \right) =$$

$$\frac{1}{\Delta} \left( \begin{array}{ccc} C(c+1,m,y) - C(c,m,y) & C(c,m+1,y) - C(c,m,y) & C(c,m,y+1) - C(c,m,y) \\ M(c+1,m,y) - M(c,m,y) & M(c,m+1,y) - M(c,m,y) & M(c,m,y+1) - M(c,m,y) \\ Y(c+1,m,y) - Y(c,m,y) & Y(c,m+1,y) - Y(c,m,y) & Y(c,m,y+1) - Y(c,m,y) \end{array} \right)$$

($\Delta$ = constant step width, corresponding to increase of printing ink/scale entry point)

From one iteration step to the next, $(n \to n+1)$, the following applies:

$$\left( \begin{array}{c} C_s \\ M_s \\ Y_s \end{array} \right)_{n+1} = \left( \begin{array}{c} C_s \\ M_s \\ Y_s \end{array} \right)_n + \left( \begin{array}{c} \Delta C_s \\ \Delta M_s \\ \Delta Y_s \end{array} \right)_n =$$

$$\left( \begin{array}{c} C_s \\ M_s \\ Y_s \end{array} \right)_n + \left( \frac{\partial t}{\partial s} \right)_n^{-1} \left( \begin{array}{c} \Delta C_t \\ \Delta M_t \\ \Delta Y_t \end{array} \right)_n$$

with $$\left( \begin{array}{c} \Delta C_t \\ \Delta M_t \\ \Delta Y_t \end{array} \right)_n = \left( \begin{array}{c} C_t \\ M_t \\ Y_t \end{array} \right)_{SoH} - \left( \begin{array}{c} C_t \\ M_t \\ Y_t \end{array} \right)_n$$

as the divergence to be minimized.

It may occur that a required color stimulus is outside the chromaticity range of the print scale measured. The iteration process provides in this case a dot percentage of >100% and/or <0% for one or more colors. For these highly saturated colors that cannot be reproduced, substitute values can be ascertained. It is not permissible to extrapolate beyond the limits of the scale, since the substitute value so obtained depends on what point of the color cube the scale is left during iteration, i.e. on the starting value. The result is discontinuities (color fluctuations) in the case of highly saturated colors, which indicate that a transformation of this type is not sufficient. Averaging processes applied subsequently to the three-dimensional table only displace these faults, but do not eliminate them. To remove this difficulty, a transition is made to another color model, i.e. an HSL color model giving hue, saturation and lightness of the colors.

If the iteration process leaves the color space of the scale, the required color stimulus can be generated by correction to the next one obtainable using the scale.

The substitute color may have a lower saturation and, in the case of very bright or very dark hues, also a slightly different lightness. However, changes in the hue should not be permissible. A color space similar to the CIE Lab model is defined in accordance with the invention and converted to that model with respect to HSL (hue, saturation, lightness):

The following applies:

$$L = 116 \left( \sqrt[3]{(Y/Y_o)} - 16 \right)$$

$$a = 500 \left( \sqrt[3]{(X/X_o)} - \sqrt[3]{(Y/Y_o)} \right)$$

$$b = 200 \left( \sqrt[3]{(Y/Y_o)} - \sqrt[3]{(Z/Z_o)} \right)$$

$H = \arctan(b/a)$ $$S = \sqrt{(a^2 + b^2)}$$

For quantization of this color space, a table with a 20 bit address area, subdivided into 128 steps for lightness, 128 steps for hue and 64 steps for saturation, is reserved. Assume the maximum value for L is reached for maximum fluctuations of R, G and B, and that saturation is standardized to the maximum value occurring in the blue hues R=0, G=0, B=max. In this way, the entire range of positive EBU-RGBs is covered.

The following applies:

$$\begin{array}{c} X \\ Y = \\ Z \end{array} \left( \begin{array}{ccc} 0.4303 & 0.3416 & 0.1782 \\ 0.2219 & 0.7068 & 0.0713 \\ 0.0202 & 0.1296 & 0.9387 \end{array} \right) \left( \begin{array}{c} R \\ G \\ B \end{array} \right)$$

FIG. 7 shows the color space in a perspective view, with the lightness L shown in the vertical direction, the hues H at varying angles and the saturation S in the horizontal direction. The values given above are entered into the color space according to FIG. 7. A triple loop is now used, as described above, to obtain by iteration the appropriate values for CMY for all HSL combinations from the high-interpolated print scale. The inner loop here always runs from 0 to maximum saturation. In this way, the point at which the required color value leaves the scale range can only be found dependent on the saturation. All S values above this are allocated the CMY triple of the last color value obtained with constant L and H values.

The measures described above are based on scales of three-color composition. Complete integration of the usual fourth color, black, in the print scale would require the three-dimensional initial area to be projected onto a scale of four-dimensional composition. Instead of $n^3$ fields, $n^4$ would have to be measured, interpolation would extend to $32^4$ fields, and inversion would have to iterate in parallel between 32 3D spaces, assuming a secondary condition for black. Transformation tables thus obtained would supply correct values for every degree of chromatic color reduction (GCR) up to complete achromatic composition.

A black separation can be generated with considerably less expense that meets all the requirements placed on so-called skeleton black, and a limitation of the maximum dot precentage of all colors to values from approx. 280% (UCR) is possible without substantial losses of naturality of the color impression.

The HSL model is taken as the basis from which the dependence of the lightness, e.g. of the L component, on black is determined. To do so, a test form is proof-printed that contains n gray bars of chromatic composition. Each of these bars has a constant black component added to it in growing measure so that n "black scales" are obtained. A densitometer is sufficient for their measurement, with only the density values having to be converted into lightnesses (L). A possible color cast of the black printing ink is not covered in these observations.

The spline interpolation already mentioned is used to increase the data density until the dependence of the lightness decrease on the addition of black is available in 1% steps for each lightness level composed of three colors. If a hue can no longer be achieved using three colors with saturation at a predetermined L value, recourse is had to the next highest L level that can represent this hue, and then the lightness is reduced to the required value by the addition of black. Errors in saturation are unavoidable here, but are certainly less than those achievable with three-color darkening. In the diagram shown in FIG. 8, the lightness L is shown vertically. The saturation S is drawn horizontally. The hue H is assumed to be constant. A required color stimulus which cannot be achieved with the predetermined L value is identified as "a". A transition follows to the next highest color stimulus achievable, identified in FIG. 8 as "b". Then black is added to return to the required value of "a". This required value is identified with "c". Strictly speaking, the transitions between the levels due to the black apply only in the (measured) achromatic axis. Highly saturated colors might undergo a slight change in the chromatic hue or are shown slightly brighter or darker than required. The black separation thereby generated differs from a conventional one derived from the equation K = gradation * Min ($C_s$, $M_s$, $Y_s$)

by a moderate chromatic color reduction (GCR) and therefore by a higher addition of black in dark, full hues. This effect is welcome, permitting as it does the somewhat purer representation of these colors. There is no hard limit to the maximum total dot area (UCR), and indeed this is not absolutely necessary on account of the automatic withdrawal of the chromatic colors, but can be achieved subsequently by applying the usual UCR processes to the finished color pigment.

The entire RGB-CMYK conversion table must be in the main memory of the computer for the running time of the color reproduction system. This memory is generally limited, so that the direct representation of all 3*8 bit RGB combinations (16 million colors) is not usually possible. A double table entry point is best used to remedy this. The 256 discrete amplitudes per primary color are divided by the first table into k classes of representative values (k<256). The three-dimensional conversion table is controlled using these classes, and contains therefore only $k^3$ entries.

FIG. 9 shows a corresponding memory subdivision. For the primary stimulus R, a first table (23) is provided. Each further primary stimulus has a table (24) or (25). Tables (23), to (25) are used for addressing the three-dimensional conversion table (26). To optimize the possible dynamics of the table, the classes are selected so that quantization is adjusted to the human visual sense curve. Based on the literature (Munsell curve, CIE Lab), we allocate the primary stimuli to k areas of identical size under the cube root. Accordingly, a finer definition than 1/256 would be the result in dark hues. This is not used, so every stage of the input quantity is reproduced directly in this part. A useful color reproduction can already be achieved with k=64, however clearly perceptible stages appear when a gray-scale wedge is reproduced. To avoid a subsequent operation for "smoothing" of the separations (e.g. by addition of noise), it is advisable to raise k to 80. The memory capacity for the color pigment is then 2 Mbytes.

FIG. 10 shows in graph form the linear gradation as a function of the RGB quantization classes. From the colorimetric viewpoint, the color pigment should already optimally effect the necessary transformation, so that a subsequent modification of the CMYK separations could only worsen the image reproduction quality.

First the scale of the reproduction process is proof-printed. The chromatically composed gray axis of the scale is first studied. It provides information on the hue gradations (e.g. 5 of each) to be measured and that are to form the 125 support points of the scale for the interpolation process. The (per se independent) measurement of the black scales (approx. 25 fields) now follows.

The measurement itself is preferably performed using the spectrophotometer (6). The spectra are standardized to the standard white tile and assessed with the characteristics of one of the conventional light sources (D 50, D 53, D 65) and the standard spectral value curves of the CIE 2° standard observer for X, Y, Z. The various standardized light types require various centering operations for conversion to EBU-RGB, so that achromatic hues in the system have 3 equal values.

In the method described above, the introduction of a model CMY coordinate system adapted to the print scale linearizes the data, and increases the accuracy of interpolation (two-stage system; first mathematical approximation to the scale, and only then processing of the measured values). The various elements of the image to be reproduced are transformed one after the other singly from RGB or XYZ to CMY (iteration). The method can be accelerated using cache procedures.

The color range coverable in RGB is quantized into k perception-adapted classes per coordinate axis. For all k-possible combinations of R, G, B, the appropriate color value in CMY is (without image to be processed) determined in advance (double table access). For the running time of the color system, separation is therefore very fast (lookup table). The buildup of the lookup table is not possible with respect to the memory capacity until requantization (k=65=80=100, 1 MB−2 MB−8 MB) has been completed.

The intermediate step via a hue-saturation-lightness color model allows easy reproduction of non-reproducible colors on the surface of the CMY printing ink pigment. It is possible here to place the error in any of the axes perceived as orthogonal (!) by the human visual sense. The method is practicable in particular thanks to the use of the perception-active classes.

Thanks to the HSL intermediate step, the influence of black (darkening, desaturation) can be described in two coordinates instead of three (ignoring the hue effects). In this way, it is possible to calculate both a skeleton black with a correct hue value as well as the substitution of black for the gray component achieved by blending chromatic colors, i.e. the hue is not dependent on the addition of black in the first approximation.

The following applies:

$$\delta H/\delta K = 0$$

This secondary condition creates up n 3D spaces in L, S, K.

This saves the need for iteration in 4 dimensions (C, M, Y, K).

Although various minor changes and modifications might be proposed by those skilled in the art, it will be understood that I wish to include within the claims of the patent warranted hereon all such changes and modifications as reasonably come within my contribution to the art.

We claim:

1. A method for generating a digital look-up table for three printing inks in image reproduction equipment from color scan values obtained by photoelectric scanning of originals, comprising the steps of:
   measuring full colors of the three printing inks and white by scanning corresponding originals;
   determining model colors that have an approximately linear relationship to the printing inks by use of a position of a chromaticity range of a print scale having scale colors, three primary stimuli of the model colors in a chromaticity diagram each lying on an extension of trajectories of the scale colors through a white point, a triangle set up by lines running between said three primary stimuli enclosing the chromaticity range of the print scale;
   adjusting a scale division of the primary stimuli with a cube root to a linear gradation of the printing inks;
   determining a number of fields to be scanned by using space diagonals of the printing inks as a function of said model colors;
   further processing scan values of said fields to be scanned by a cubic spline interpolation with a higher number of support points for generating a look-up table;
   storing values of the model colors as a function of printing ink values;
   making the color stimuli for cyan, magenta and yellow for the model colors depend on the primary colors according to the following relationships:

$$C_t = \sqrt[3]{(1 - rR)}, \quad M_t = = \sqrt[3]{(1 - G)}, \text{ and } Y_t = \sqrt[3]{(1 - B)}$$

wherein the stimuli for cyan, magenta and yellow are referenced $C_t$, $M_t$, $Y_t$ and the primary stimuli red, green and blue are referenced "R, G, B";
   measuring the space diagonals at several scanning points and using the space diagonals for determining scan values; and
   a cubic power of said scan values determining a number of fields to be scanned.

2. A method according to claim 1 wherein a lookup table of the printing inks as a function of the model colors is created by iteration from the look-up table, said look-up table being stored.

3. A method according to claim 1 wherein a lightness/saturation/hue color model is used to determine substitute values for colors for those colors not reproducible in accordance with the look-up table, where values equally spaced and orthogonal according to a human visual sense curve are adjusted in lightness and saturation while retaining hue.

4. A method according to claim 1 wherein iteration for all combinations necessary for printing in a color stimulus system proceeds from a random point in a print scale table and initially generates both a difference between a color stimulus required and any scale entry point and a complete differential in this point in order to ascertain a vector that gives in scale increments an amount and direction of a transition to another entry point more closely approximating to the required color stimulus, for said scale entry point appropriate computation steps being taken to establish a further vector that gives a transition to a scale entry point better suited to the required color stimulus, said computation steps for ascertaining additional scale entry points being repeated until the scale entry point obtained remains the same, and color value differences still remaining being minimized by linear interpolation.

5. A method according to claim 1 wherein for color stimuli outside the chromaticity range of the measured print scale the respective color stimulus is corrected with reference to a nearest color stimulus achievable with the print scale, while retaining hue and changing saturation, and if necessary, brightness, in accordance with a lightness/saturation/hue model.

6. A method according to claim 5 wherein the following equations apply for the lightness/saturation/hue model:

$$L = 116 \left( \sqrt[3]{(Y/Y_o)} - 16 \right)$$

$$a = 500 \left( \sqrt[3]{(X/X_o)} - \sqrt[3]{(Y/Y_o)} \right)$$

$$b = 200 \left( \sqrt[3]{(Y/Y_o)} - \sqrt[3]{(Z/Z_o)} \right)$$

$$H = \arctan(b/a)$$

$$S = \sqrt{(a^2 + b^2)}$$

with $X_0$, $Y_0$ and $Z_0$ as the color stimulus of the white point, in which "L" means the lightness, "H" the hue, "S" the saturation and "X, Y, Z" virtual primary stimuli as normal stimuli, wherein corresponding values for lightness, hue and saturation are filed in a table with one address space for each, with stipulation of a maximum lightness value for maximum fluctuations of the primary stimuli and with standardization of saturation to a maximum value occurring in blue hues, and wherein for all combinations of hue, saturation and lightness occurring, values of the printing inks are determined by iteration and then stored.

7. A method according to claim 1 wherein a function of a darkening process for a printing ink is predetermined as a function of black, and wherein for a color stimulus with a lightness not achievable by addition of the other color stimuli, black printing ink is added, with a computation following in an HSL space.

8. A method according to claim 7 wherein the computation assumes an orthogonality of H and K in sections in a three-dimensional sub-space LSK at H wherein K represents black color.

9. A method according to claim 1 wherein the primary colors are divided in each case into a number of classes of representative values stored in a separate table, and wherein the values of said tables control a three-dimensional table of the printing inks.

10. A method according to claim 9 wherein the classes are adjusted to a human visual sense curve.

11. A method according to claim 1 including the steps of providing a light source and a measuring head to which is connected a spectrophotometer connected at its output side to a cubic spline interpolator controlled by a sequential control, to which is connected a digital memory controlled by the sequential control.

12. A method according to claim 11 wherein the sequential control is provided as a central computer.

* * * * *